United States Patent
Shiraishi et al.

Patent Number: 6,091,423
Date of Patent: *Jul. 18, 2000

[54] IMAGE TRANSFORMATION SYSTEM FOR PRODUCING A KALEIDOSCOPE EFFECT

[75] Inventors: Toshihiro Shiraishi; Katsuakira Moriwake, both of Kanagawa, Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/683,652

[22] Filed: Jul. 15, 1996

Related U.S. Application Data

[63] Continuation of application No. 08/227,035, Apr. 13, 1994, abandoned.

[30] Foreign Application Priority Data

Apr. 17, 1993 [JP] Japan ................................. 5-113967

[51] Int. Cl.[7] ............................................... G06F 17/00
[52] U.S. Cl. ...................... 345/433; 348/580; 348/583; 345/190; 345/437; 345/438
[58] Field of Search .................................. 395/118, 133, 395/137, 138; 345/190, 418, 433, 437, 438; 348/580, 583

[56] References Cited

U.S. PATENT DOCUMENTS

| 3,976,982 | 8/1976 | Eiselen ................................ 345/437 X |
| 4,700,228 | 10/1987 | Heerah ..................................... 348/580 |
| 4,754,491 | 6/1988 | Mischler et al. ............... 364/725.03 X |
| 5,051,734 | 9/1991 | Lake, Jr. .................................. 345/190 |

FOREIGN PATENT DOCUMENTS

| 0 437 074 | 7/1991 | European Pat. Off. . |
| 2 164 520 | 3/1986 | United Kingdom . |

*Primary Examiner*—Mark K. Zimmerman
*Assistant Examiner*—Lance W. Sealey
*Attorney, Agent, or Firm*—Frommer Lawrence & Haug, LLP.; William S. Frommer

[57] ABSTRACT

In an image transformation system, an image formed by the inputted video signal is stored in a memory to be read out by the read address of a predetermined read address generating circuit, so that a predetermined image transformation is performed to the image, by merging the mirror processing upon the orthogonal coordinates and the mirror processing upon the polar coordinates. As a result, a transformation image that looks as if it is seen through a kaleidoscope can be obtained.

4 Claims, 6 Drawing Sheets

IMAGE TRANSFORMATION SYSTEM FOR PRODUCING A KALEIDOSCOPE EFFECT

This application is a continuation of application Ser. No. 08/227,035, filed Apr. 13, 1994 now abandoned.

BACKGROUND OF THE INVENTION

1. Field of the Invention

This invention relates to an image transformation system, and more particularly, to a special effect processing system for providing special image effects to video signals.

2. Description of the Related Art

A conventional image transformation system is disclosed, for example, in U.S. Pat. No. 5,070,465.

Heretofore, in this type of image transformation system, the input video signal is sequentially written in a specified area of a frame memory on the basis of a write address, which is outputted from a write address generating circuit. The data stored in this frame memory is read out based on a read address that is supplied from a read address generating circuit. Thereby, a variety of special effects are given to the video signal in order to transform the displayed image that corresponds to the video signal.

However, in this type of image transformation system, which utilizes the read address control system, there has been no system which provides kaleidoscope-like special effects to a video signal, and which performs, for example, an image transformation processing for reflecting a portion of an image at every specified angle for the center of the image and for reflecting a portion of an image at every specified angle for the center of the image and for reflecting a portion of an image parallel to the X-axis and the Y-axis on the X-Y plane.

SUMMARY OF THE INVENTION

In view of the foregoing, an object of this invention is to provide an image transformation system for giving a special effect in which an image changes into a transformed image as if it is looked through a kaleidoscope.

The foregoing object and other objects of the invention have been achieved by the provision of an image transformation system 10 for storing an image derived from input video signal S1, which is stored in a memory 11. Input video signal S1 is read from the memory 11 on the basis of a read address that is supplied from a predetermined read address generating means 13. The image transformation system 10 further comprises a first mirror processing means 24, 25 for reflecting the read address to be inputted to the read address generating means 13 at predetermined reflecting straight lines LX, LY in the orthogonal coordinates; and a second mirror processing means 26, 27 for reflecting the read address, which is processed by the first mirror processing means 24, 25 and then transformed into polar coordinates, at a predetermined reflection line LΘ. The output of the second mirror processing means 26, 27 is then transformed into orthogonal coordinates, and thereafter, it is outputted to the memory 11 as the read address.

Further, in this invention, the second mirror processing means 26, 27 shift a part of the line (represented by function F(Θ)) in order to transform the angle data Θ of the polar coordinates so as to match the line "Θ'=Θ" having no change of the angle Θ. Thereby, the second mirror processing means rotatively shift the reflecting line LΘ around the center "O" of effect in every predetermined angle.

Further, in the invention, the second mirror processing means 26, 27 shift a plurality of portions of the line determined by function F(Θ) to transform the angle data Θ of the polar coordinates so as to match the line "Θ'=Θ". Thereby, the second mirror processing means form the original image portion SΘ around the center "O" of effect with each interval of a predetermined angle.

Further, in this invention, the second mirror processing means 26, 27 offset the center point "O" of effect in order to intersect the reflection line LΘ by the predetermined amount Xc, Yc.

Further, in this invention, the read address generating means 13 is arbitrarily set to the position Px, Py, at which point the reflection line LX, LY is arranged in the first mirror processing means 24, 25. The read address generating means also includes the division number No of the reflection line LΘ within one round in the second mirror processing means, and the original image portion PS to be reflected.

The nature, principle and utility of the invention will become more apparent from the following detailed description when read in conjunction with the accompanying drawings in which like parts are designated by like reference numerals or characters.

BRIEF DESCRIPTION OF THE DRAWINGS

The following detailed description, given by way of example and not intended to limit the present invention solely thereto, will best be understood in conjunction with the accompanying drawings in which.

DETAILED DESCRIPTION OF THE EMBODIMENT

Figure 1:
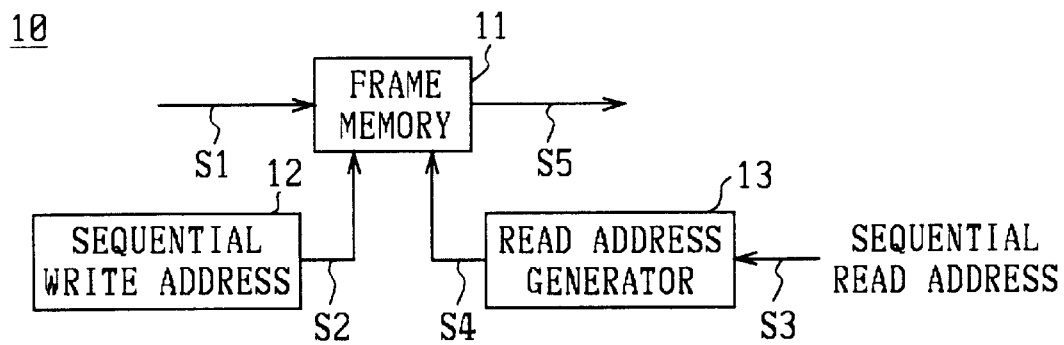
FIG. 1 is a block diagram showing one embodiment of an image transformation system according to this invention.

Preferred embodiments of this invention will be described with reference to the accompanying drawings:

Referring to FIG. 1, an image transformation system 10 is supplied with a digitalized input video signal S1, which is written into a frame memory 11 on the basis of the write address signal S2 outputted from a sequential write address counter 12. No transformation of signal S1 occurs as it is written into frame memory 11.

A read address generator 13 generates a read address for the purpose of reading out the image data from the frame memory 11. After the read address generator 13 is supplied with a sequential read address signal S3, it then outputs the processed read address to the frame memory 11 as a read address signal S4. Then, an output video signal S5, which is read out from the frame memory 11 on the basis of the read address, forms the image in which the specified change is applied to the input video signal S1.

Figure 2A:
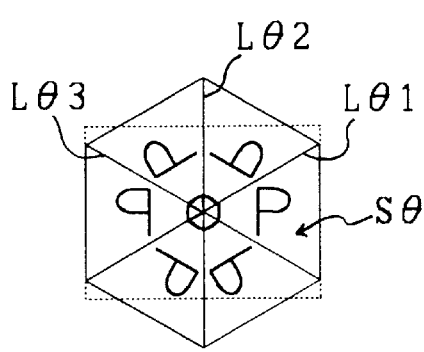
FIGS. 2A to 2C are schematic diagrams for the explanation of the kaleidoscope effect generated by the image transformation system in FIG. 1.
Figure 2B:
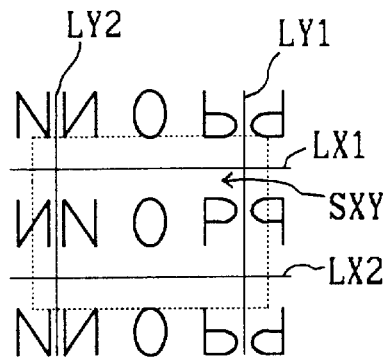
Figure 2C:
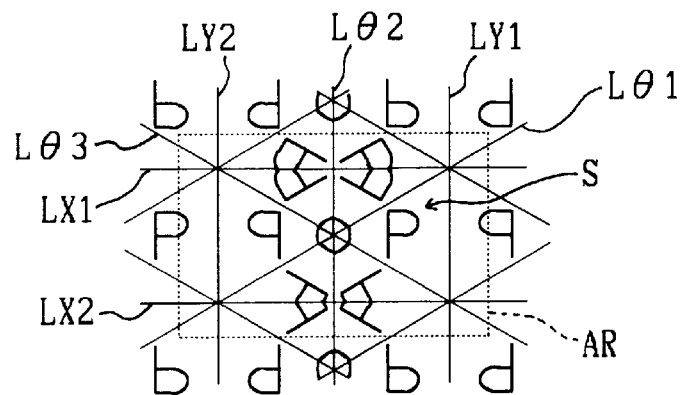

FIGS. 2A to 2C show transformed images that have been given a so-called kaleidoscope effect in the image transformation system 10. In FIG. 2A, the original image SΘ is reflected about the lines LΘ1, LΘ2, and LΘ3, which are radially positioned at every specified angle from the center point "O" of the image. Also, as shown in FIG. 2B, the original image SXY is reflected by the lines LX1, LX2, and LY1, LY2, which are respectively parallel to the X-axis and Y-axis in the X-Y plane. The mirror processing in the polar coordinate e direction (FIG. 2A) and the mirror processing in the orthogonal coordinates XY (FIG. 2B) are synthesized, so that, as shown in FIG. 2C, a transformed image that looks as if it were looked through a kaleidoscope can be obtained. Here, AR indicates the actual display area to be displayed.

Figure 3:
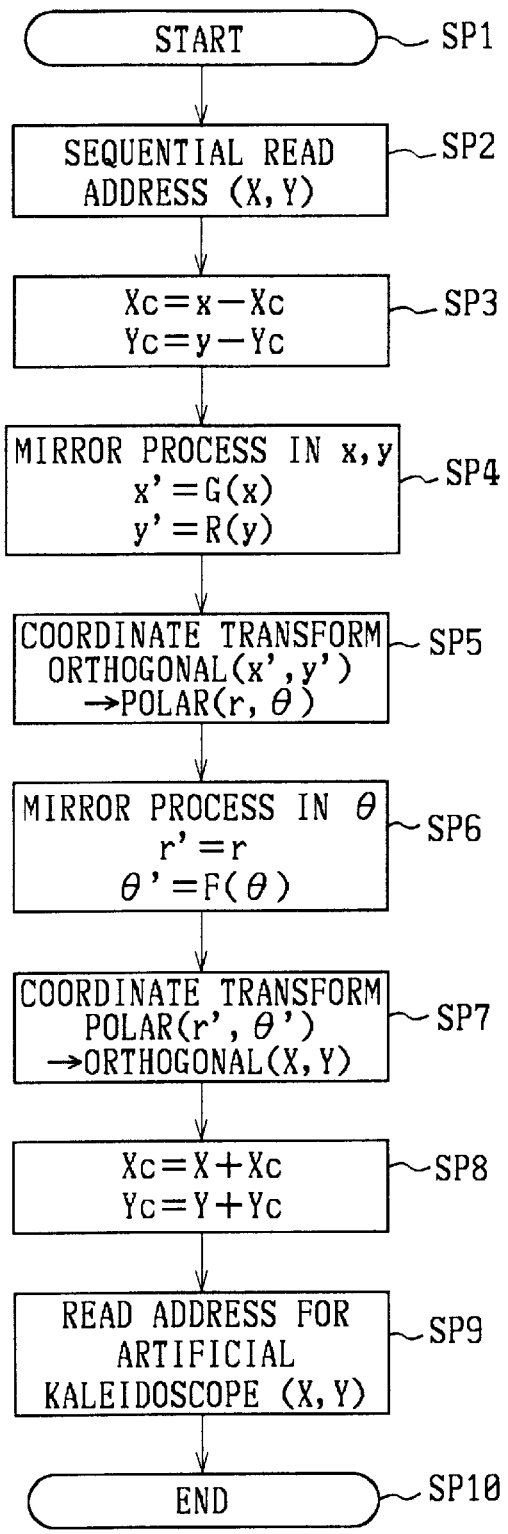
FIG. 3 is a flow chart showing the read address generating procedure for generating a kaleidoscope effect according to the image transformation system in FIG. 1.

FIG. 3 shows a kaleidoscope effect read address generating procedure in the read address generator 13. At step SP1, the read address generator 13 inputs the sequential read address, which in step SP2 is specified in orthogonal coordinates (X, Y) by read address signal S3, and then proceeds to the following step SP3.

In step SP3, the read address generator 13 executes the calculation of "xc=x−Xc" and "Yc=y−Yc", thus denoting the center of effect by Xc and Yc, in order to obtain the center of effect from the inputted read address x, y.

In step SP4, the read address generator 13 executes a mirror processing in the specified coordinates x, y in accordance with the following equations:

$$x' = G(x) \tag{1}$$

$$y' = R(y) \tag{2}$$

Figure 4:
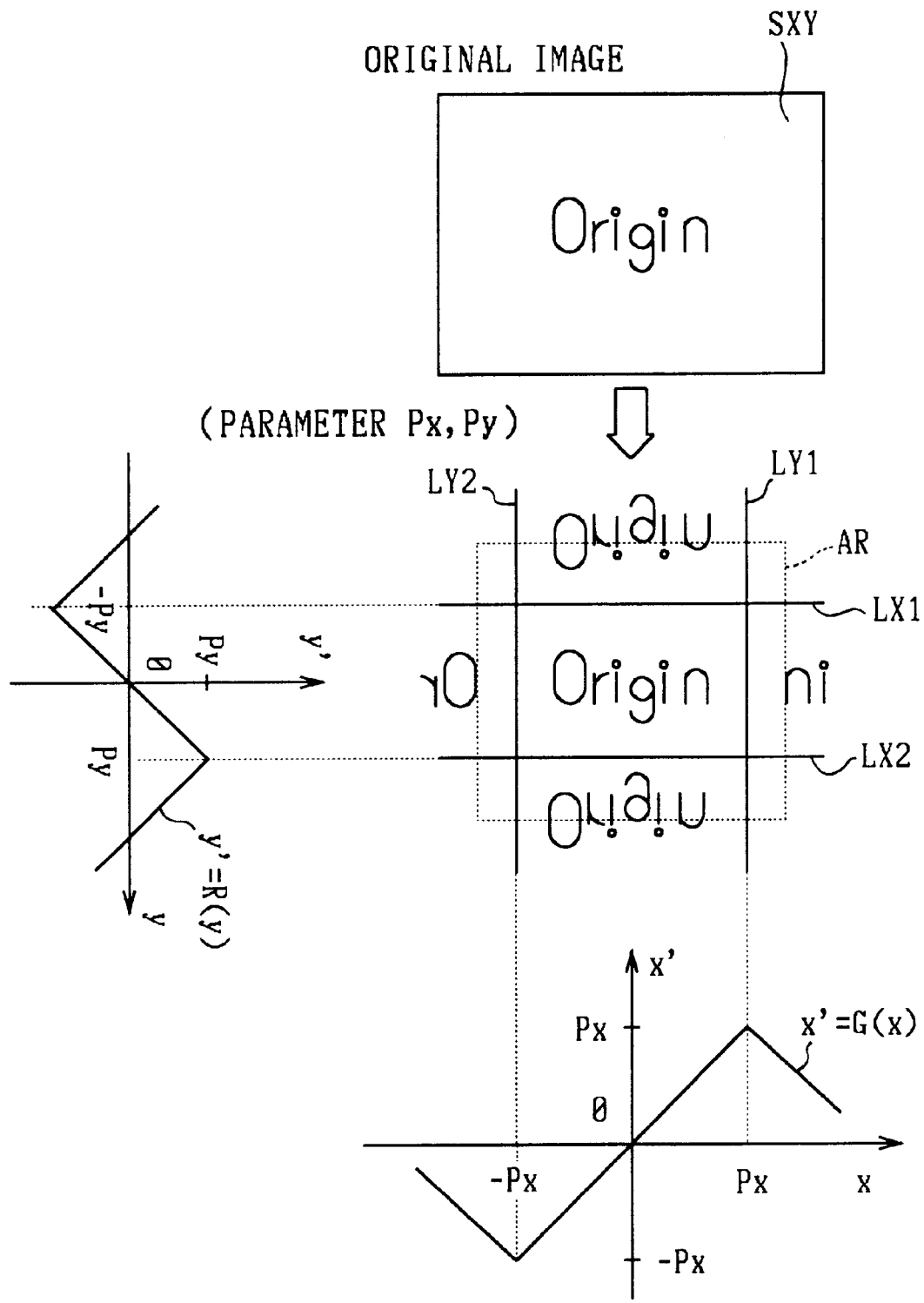
FIG. 4 is a schematic diagram for the explanation of the case where the orthogonal coordinates are reflected.

Here, denoting the mirror position at "x" by "Px" and the mirror position at "y" by "Py", the function G(x) and R(y) in the mirror processing becomes, as shown in FIG. 4, a triangular wave function in which respective values change in the lines LX1, LX2 and LY1, LY2 positioned in the mirror position.

At step SP5, by executing the equations, $$r = \sqrt{x'^2 + y'^2} \tag{3}$$

$$\theta = \tan^{-1}\left[\frac{Y'}{X'}\right] \tag{4}$$

the calculated values "x'" and "y'", which correspond to the read address coordinates "x" and "y" that were obtained by the mirror processing in the above procedure, are transformed from the orthogonal coordinates (x', y') to the polar coordinates (r, Θ). At the following step SP6, mirror processing upon the polar coordinate Θ is executed in accordance with the following equations:

$$r' = r \tag{5}$$

$$\Theta' = F(\Theta) \tag{6}$$

Figure 5A:
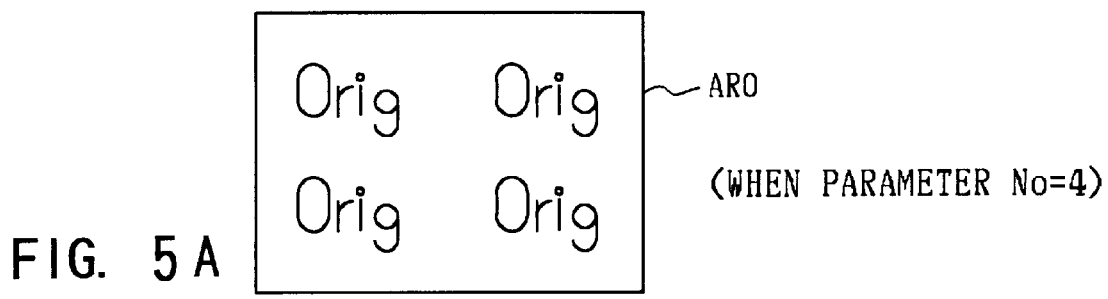
FIGS. 5A to 5E are schematic diagrams for the explanation of the case where the polar coordinates are reflected.
Figures 5B, 5C:
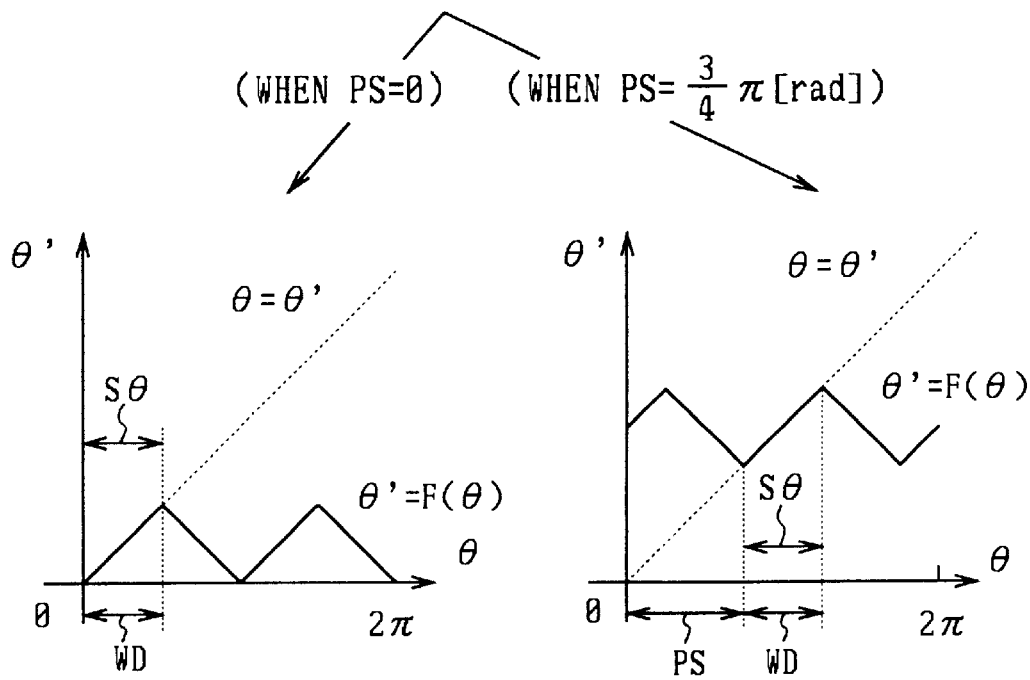
Figure 5D:
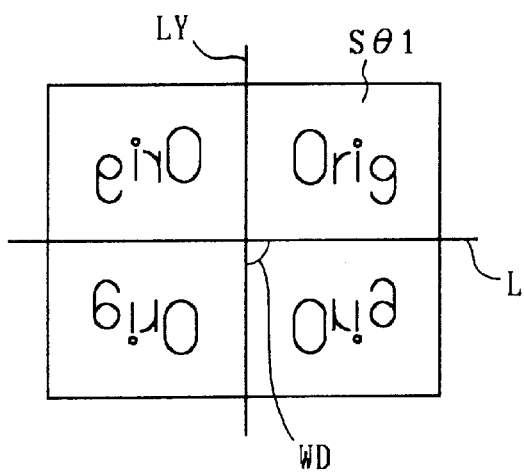

Here, as shown in FIGS. 5A to 5E, the function F(Θ) in the mirror processing regarding the Θ direction are specified from the number No to divide one round angle and the position PS of the original image SΘ to be copied, as follows. For example, when the position PS of the original image SΘ in the display image ARO is specified as "PS=O", in the case where the position of the parameter No is No=4(FIG. 5A), as shown in FIG. 5B, the function F(Θ) that turns over the image upon the line represented by "Θ'=Θ" in the range of the angle between 0° and WD (=2π/No [rad]) in every angle WD, and the image at the angle between 0° to WD is specified as the original image SΘ. As a result, as shown in FIG. 5D, the mirror effect produces an image in which the original image sΘ1 specified among the original display image ARO has been reflected at a line LX parallel to the X-axis and a line LY parallel to the Y-axis.

Figure 5E:
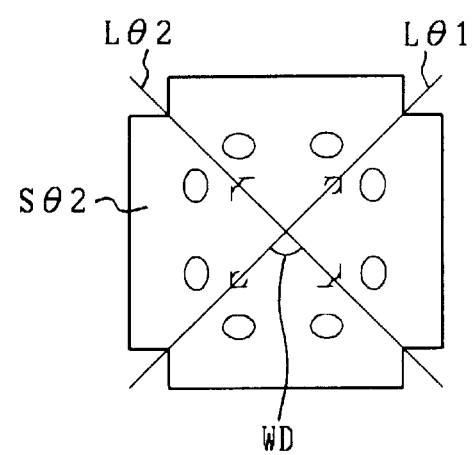

On the contrary, when the position PS of the original image SΘ in the display image ARO (FIG. 5A) is specified as "PS=3/4π [rad]", as shown in FIG. 5C, the function F(Θ) that turns over the image upon the line represented by "Θ'=Θ" at angle between PS to PS+WD (=2π/No [rad]) in every angle WD, and the image at the angle between PS to PS+WD is specified as the original image SΘ. As a result, as shown in FIG. 5E, the mirror effect produces an image in which the original image SΘ2 specified among the original display image ARO has been reflected at the reflection line LΘ1 and LΘ2.

In this way, the polar coordinates (r', Θ') calculated in the mirror processing step SPO6 in FIG. 3 is transformed into the orthogonal coordinates (X, Y) in the following step SP7 by the relational expression represented by the following equations:

$$X = r'x\cos(\Theta') \tag{7}$$

$$Y = r'X \sin(\Theta') \tag{8}$$

Then, the calculated orthogonal coordinates (X, Y) are supplied to the memory 11 as the read address from the read address generator 13. Therefore, the video signal is read out from the memory 11 based on the read address, and a transformation image that looks as if it is seen through a kaleidoscope, as described in FIGS. 2A to 2C, can be displayed at a display monitor.

Figure 6:
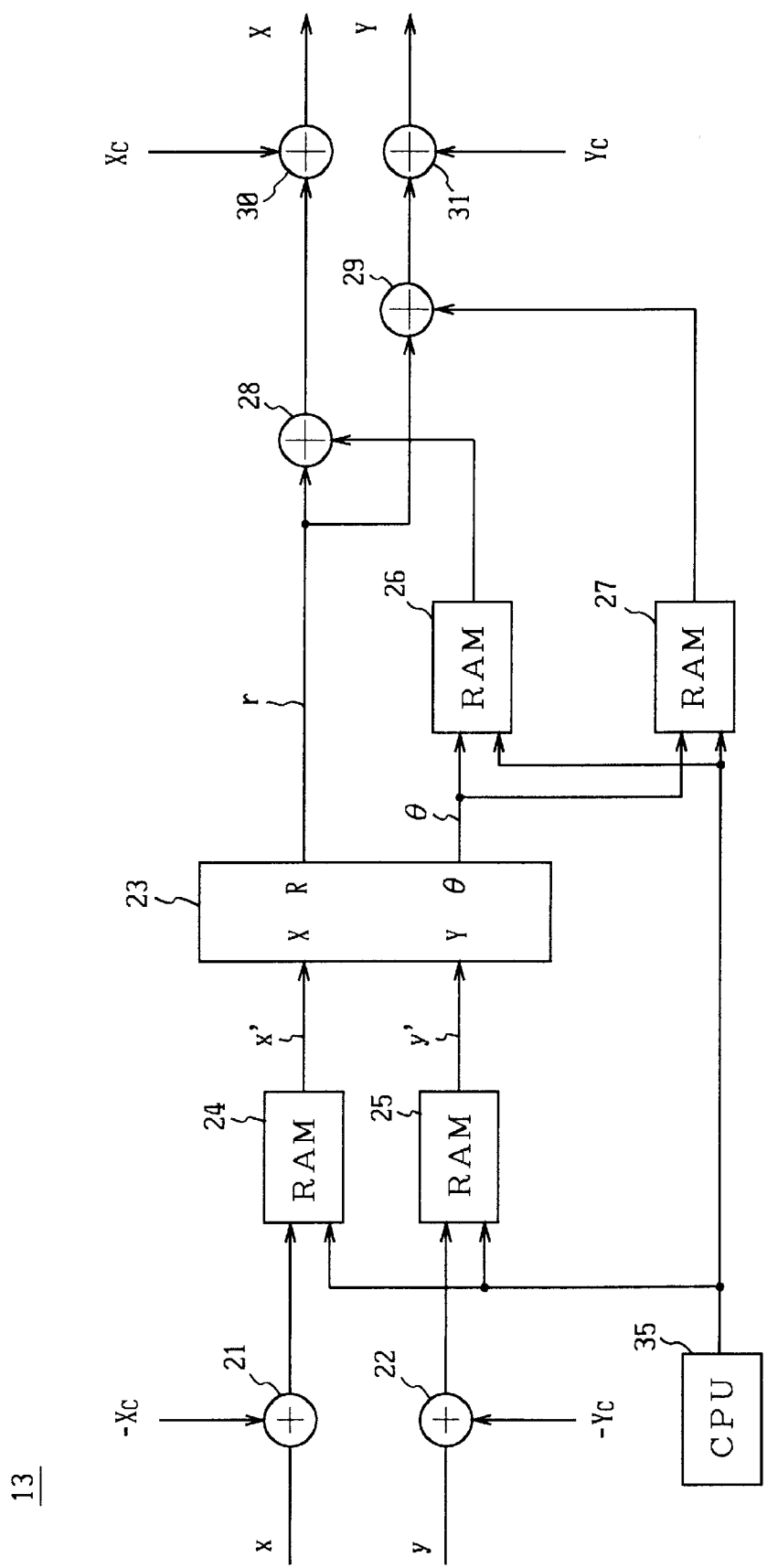
FIG. 6 is a block diagram showing the constitution of the read address generator in the image transformation system of FIG. 1.

Here, FIG. 6 shows the constitution of the read address generator 13 according to this invention. The sequential read address "x" is added to the center position data (−Xc) of the effect at an adding circuit 21, and it is supplied to a RAM 24.

The RAM 24 is a table which is referred by the read address, and the data of "x'=G(x)" is set by a CPU 35. Therefore, the output "x'" from the RAM 24 is supplied to a coordinate transformation circuit 23. Also, the sequential read address "y" is added to the center position date ('Yc) of the effect at an adding circuit 22 and is supplied to a RAM 25.

The RAM 25 stores a table which is referred by the read address, and the data of "y'=R(y)" is set by the CPU 35. Therefore, the output "y'" from the RAM 25 is supplied to the coordinate transformation circuit 23.

The coordinate transformation circuit 23 transforms the orthogonal coordinates of the read address into polar certainties (r, Θ), and it outputs the radius data "r" to an adding circuit 28. On the other hand, the coordinate transformation circuit 23 supplies the angle data Θ to the RAMs 26 and 27, respectively.

The RAM 26 is a table which is referred by the polar coordinate transformed angle data Θ, and the calculation data of "cos(Θ')=cos(F(Θ))" is set by the CPU 35. Also, the RAM 27 is a table which is referred by the polar coordinate transformer angle data Θ, and the calculation data of "sin (Θ)=sin(F(Θ))" is set by the CPU 35.

In this way, adding circuit 28 adds the output of the RAM 26 to the radius data "r" outputted from the coordinate transformation circuit 23. Thus, the output of RAM 26 is transformed into the orthogonal coordinate data. Further, this data is added to the center position data Xc of the effect at an adding circuit 30 so as to obtain the read address X.

On the contrary, the output of the RAM 27 is added to the radius data "r" outputting from the coordinate transformation circuit 23 at an adding circuit 29, and is thereby transformed into the orthogonal coordinate data. Further, the data is added to the center position data Yc of the effect at an adding circuit 31 so as to obtain the read address Y.

With the above constitution, by merging the mirror effect upon the orthogonal coordinates and the mirror effect upon the polar coordinates, the transformation image that looks as if it is seen through a kaleidoscope, as described in FIGS. 2A to 2C, can be obtained.

Figure 7A:
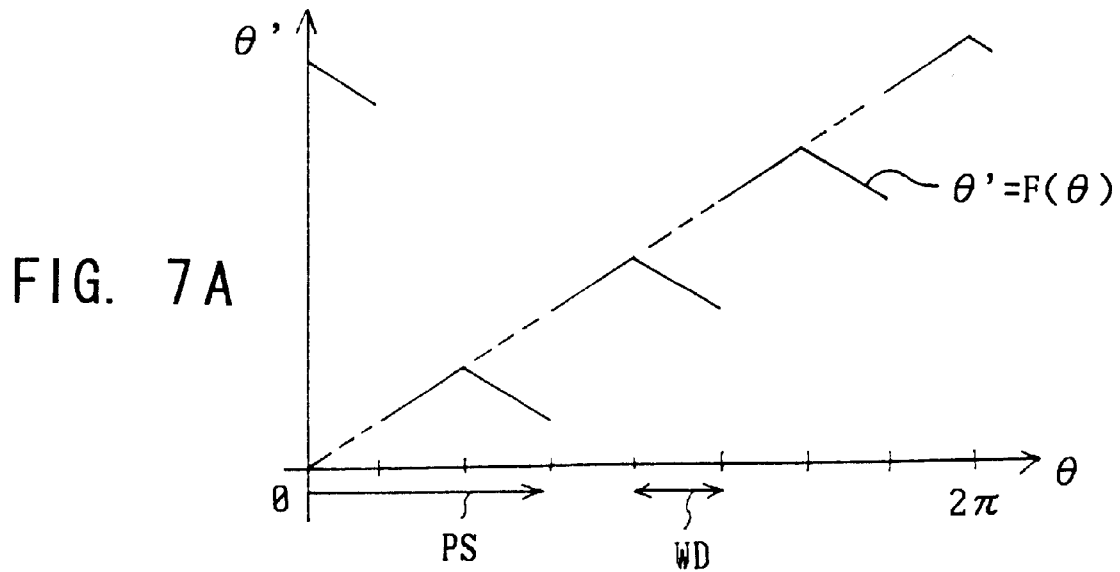
FIGS. 7A and 7B are schematic diagrams for the explanation of the reflecting processing of the polar coordinates according to another embodiment.
Figure 7B:
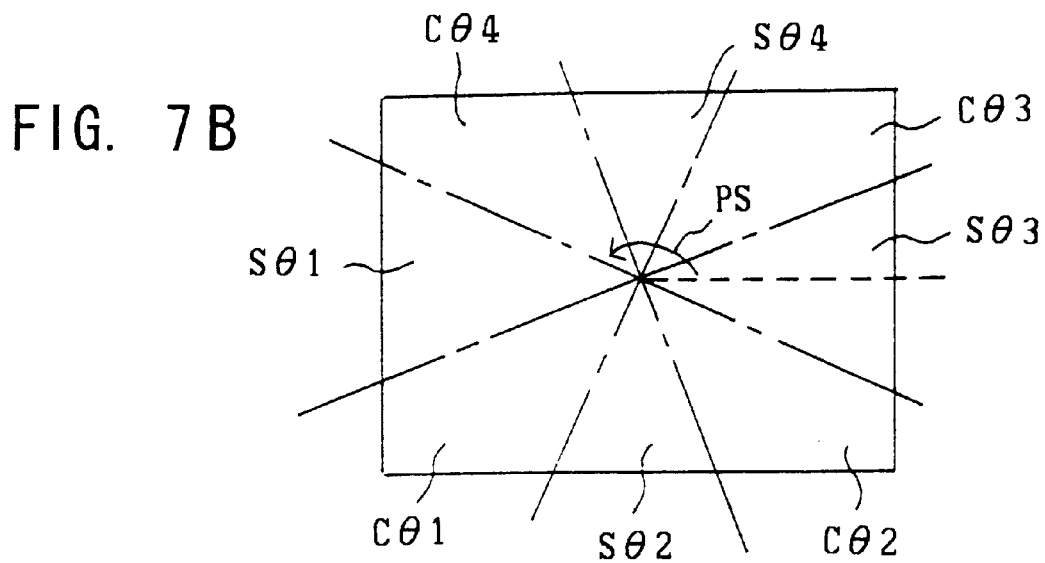

Note that the embodiments discussed above have dealt with the case where the original image SΘ is reflected at the reflection lines LX, LY or LΘ1, LΘ2 in execution of the mirror processing in the polar coordinate Θ direction. In an alternative embodiment, by using the function "Θ'=F(Θ)" as shown in FIG. 7A, the original images SΘ1 to SΘ4 can be displayed at places apart from each other as shown in FIG. 7B. Here, CΘ1 to CΘ4 are images formed by reflecting the respective images SΘ1 to SΘ4.

Furthermore, the embodiments discussed above have dealt with the case in which the mirror effect is obtained on a two-dimensional plane. However, the present invention is not limited to this but it can also be arranged so that the sequential read address (x, y) inputted to the read address generator 13 is transformed by a three-dimensional matrix in advance.

That is, denoting the read address transformed by the three-dimensional matrix by $X_{3D}$ and $Y_{3D}$, and the three-dimensional transform matrix by $\alpha_{11}$ to $\alpha_{11}$ to $\alpha_{33}$, the read address ($X_{3D}$, $Y_{3D}$) which is represented by the equations:

$$x_{3D} = \frac{\alpha 11 \times x + \alpha 12 \times y + \alpha 13}{\alpha 31 \times x + \alpha 32 \times y + \alpha 33} \quad (9)$$

$$y_{3D} = \frac{\alpha 21 \times x + \alpha 22 \times y + \alpha 13}{\alpha 31 \times x + \alpha 32 \times y + \alpha 33} \quad (10)$$

may be inputted to the read address generator 13.

According to this invention described above, by merging the mirror processing upon the orthogonal coordinate and the mirror processing upon the polar coordinate, there can be realized an image transformation system, that looks as if it is seen through a kaleidoscope can be obtained.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. An image transformation system for performing image transformation processing on an input image by reading input image data into a storage means, performing mapping on orthogonal coordinates of the input image data to generate modified orthogonal coordinates, and forming an output image by reading said image data from said storage means according to said modified orthogonal coordinates; wherein said output image that results from said transformation processing appears as a kaleidoscopically rearranged version of said input image, not merely a rotated version of said input image; and wherein said mapping is performed by a mapping means, said mapping means comprising:

first mirror processing means for generating reflected orthogonal coordinates based upon predetermined equations, said reflected orthogonal coordinates being generated by processing said orthogonal coordinates of the input image data using a lookup table which is set by a central processing unit such that said input image data is reflected about multiple predetermined reflection straight lines which are respectively parallel to the X-axis and Y-axis in the X-Y plane;

first transformation means for transforming said reflected orthogonal coordinates into polar coordinates;

second mirror processing means for generating reflected polar coordinates based upon predetermined equations, said reflected polar coordinates being generated using a lookup table which is set by said central processing unit by reflecting said polar coordinates about multiple predetermined polar straight reflection lines which are radially positioned at every specified angle from the center point of the image; and second transformation means for transforming said reflected polar coordinates into said modified orthogonal coordinates by adding the output of the first transformation means and the second mirror processing means.

2. The system according to claim 1, wherein said second mirror processing means shifts a plurality of portions of lines generated by a function for transforming the angle data on said polar coordinates so as to match the line Θ'=Θ, thereby forming original image portions around a center of effect at intervals of a predetermined angle.

3. The system according to claim 1, wherein said second mirror processing means offsets the center point of effect for intersecting said polar reflecting line by a predetermined amount.

4. The system according to claim 1, wherein the position where the reflection line is arranged in said first mirror processing means, a division number of said reflection line in said second mirror processing means, and the original image portion to be reflected, are set arbitrarily.

* * * * *